United States Patent
Liu et al.

(10) Patent No.: US 12,300,841 B2
(45) Date of Patent: May 13, 2025

(54) BATTERY MODULE

(71) Applicant: CONTEMPORARY AMPEREX TECHNOLOGY (HONG KONG) LIMITED, Hong Kong (CN)

(72) Inventors: Cunrui Liu, Ningde (CN); Yangzhi Huang, Ningde (CN); Jihua Yao, Ningde (CN); Sheng Shen, Ningde (CN); Liang Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 856 days.

(21) Appl. No.: 17/127,328

(22) Filed: Dec. 18, 2020

(65) Prior Publication Data

US 2021/0111461 A1   Apr. 15, 2021

Related U.S. Application Data

(63) Continuation of application No. PCT/CN2020/104678, filed on Jul. 25, 2020.

(30) Foreign Application Priority Data

Aug. 23, 2019   (CN) .......................... 201921384580.3

(51) Int. Cl.
*H01M 50/271* (2021.01)
*H01M 50/244* (2021.01)
(Continued)

(52) U.S. Cl.
CPC ....... *H01M 50/271* (2021.01); *H01M 50/244* (2021.01); *H01M 50/284* (2021.01)

(58) Field of Classification Search
CPC ............ H01M 50/271; H01M 50/244; H01M 50/284; H01M 50/287; H01M 50/296; H01M 50/204
See application file for complete search history.

(56) References Cited

U.S. PATENT DOCUMENTS 4,880,713 A    11/1989  Levine
2012/0301747 A1*  11/2012  Han ................... H01M 50/256
                                                    429/7
(Continued)

FOREIGN PATENT DOCUMENTS

CN    206574766 U  * 10/2017
CN    206806397 U  * 12/2017
(Continued)

OTHER PUBLICATIONS

CN 206806397 translation (Year: 2017).*
(Continued)

*Primary Examiner* — Nicholas A Smith
*Assistant Examiner* — Amanda Rosenbaum
(74) *Attorney, Agent, or Firm* — ANOVA LAW GROUP, PLLC

(57) ABSTRACT

A battery module includes a battery cell; a housing that includes an inner cavity for accommodating the battery cell; an output assembly arranged at an exterior side of the housing and electrically connected to the battery cell; and a module upper cover that seals the inner cavity. The module upper cover includes a body and an extension connected to the output assembly.

7 Claims, 16 Drawing Sheets

(51) Int. Cl.
*H01M 50/284* (2021.01)
*H01M 50/287* (2021.01)

(56) References Cited

U.S. PATENT DOCUMENTS

| | | | | |
|---|---|---|---|---|
| 2016/0043446 | A1* | 2/2016 | Fritz | H01M 50/284 |
| | | | | 429/90 |
| 2018/0123097 | A1* | 5/2018 | Jo | B65D 85/30 |
| 2019/0027731 | A1* | 1/2019 | Zeng | H01M 50/51 |
| 2020/0067035 | A1* | 2/2020 | Jeon | H01M 10/4207 |

FOREIGN PATENT DOCUMENTS

| | | |
|---|---|---|
| CN | 209104222 U | 7/2019 |
| CN | 210073989 U | 2/2020 |
| KR | 20130011309 A | 1/2013 |
| KR | 101520391 B1 | 5/2015 |

OTHER PUBLICATIONS

CN-206574766-U translation (Year: 2017).*
The World Intellectual Property Organization (WIPO) International Search Report and Written Opinion for PCT/CN2020/104678 Oct. 28, 2020 15 pages (including English translation).
The European Patent Office (EPO) Office Action for EP Application No. 20827969.5 May 23, 2022 4 Pages.
The European Patent Office (EPO) The intention to grant for EP Application No. 20827969.5 Oct. 19, 2022 5 Pages.
The European Patent Office (EPO) Extended Search Report for EP Application No. 20827969.5 Oct. 5, 2021 5 Pages.

\* cited by examiner

BATTERY MODULE

CROSS REFERENCE TO RELATED APPLICATIONS

This application is a continuation application of PCT Patent Application No. PCT/CN2020/104678, entitled "BATTERY MODULE" filed on Jul. 25, 2020, which claims priority to Chinese Patent Application No. 201921384580.3, filed with the State Intellectual Property Office of the People's Republic of China on Aug. 23, 2019, and entitled "BATTERY MODULE", all of which are incorporated herein by reference in their entirety.

TECHNICAL FIELD

This application relates to the technical field of energy storage devices, and in particular, to a battery module.

BACKGROUND

A module upper cover of a battery module provides insulation, fixing, and protection functions for the module. However, an existing structure for the module upper cover has the following disadvantages: Due to space limitation, the module upper cover does not have a fixed structure at an output electrode; as a result, during vibration of the battery module, the module upper cover may easily get warped at the output electrode.

SUMMARY

The embodiments of this application provide a battery module, which resolves the problem that a module upper cover may easily get warped at an output electrode, and an electric apparatus having the battery module.

An embodiment of this application provides a battery module, including:
- a battery cell;
- a housing, where the housing includes an inner cavity for accommodating the battery cell;
- an output assembly, where the output assembly is electrically connected to the battery cell, and the output assembly is arranged at an exterior side of the housing that faces away from the battery cell; and
- a module upper cover, where the module upper cover seals the inner cavity, and the module upper cover includes a body and an extension, the extension connected to the output assembly.

As a possible design, the extension extends from one side or two sides of the body along a length direction (L) of the battery module; and the module upper cover is substantially of a plate structure.

As a possible design, the output assembly includes a sampling output base, and the extension includes a first extension, where the first extension is connected to the sampling output base.

As a possible design, the first extension is provided with a groove along the width direction (W) of the battery module; and the sampling output base is provided with a first engaging portion, where the first engaging portion engages the groove.

As a possible design, the first extension extends downward along the height direction (H) of the battery module to provide a connection plate, the connection plate provided with a through hole; and the sampling output base is provided with a first protrusion on a side facing toward the housing, where the first protrusion fits with the through hole.

As a possible design, the battery module further includes a sampling circuit board, where one end of the sampling circuit board is connected to a reinforcing plate, and the sampling output base is connected to the reinforcing plate via a second engaging portion; and along the height direction of the battery module, the first engaging portion is higher than the second engaging portion.

As a possible design, a height difference between the first engaging portion and the second engaging portion is smaller than or equal to the thickness (W2) of the module upper cover.

As a possible design, the output assembly further includes an output electrode base and a protection cover, the protection cover connected to the output electrode base; and the extension includes a second extension, the second extension connected to the protection cover.

As a possible design, the second extension is provided with a second protrusion; and the second protrusion is in interference fit with the protection cover.

As a possible design, the output assembly includes a sampling output base and two output electrode bases;
- along the length direction (L) of the battery module, the two output electrode bases are respectively located on two sides of the housing;
- along the length direction (L) of the battery module, the sampling output base is located on either side of the housing;
- the extension includes a first extension and two second extensions;
- along the length direction (L) of the battery module, the two second extensions are respectively located on two sides of the body;
- along the length direction (L) of the battery module, the first extension is located on either side of the body;
- the first extension is connected to the sampling output base; and
- the second extensions are connected to the output electrode bases.

The above described battery module includes a module upper cover and an output assembly, where the module upper cover is provided with an extension, and the module upper cover is connected to the output assembly via the extension, and the extension is fixed to the output assembly, to prevent the module upper cover from getting warped, solving the problem that the module upper cover may easily get warped at the output electrode.

Another embodiment of this application provides an electric apparatus including the aforementioned battery module.

It should be understood that the foregoing general descriptions and the following detailed descriptions are merely examples, and do not constitute any limitation on this application.

BRIEF DESCRIPTION OF DRAWINGS

To describe the technical solutions in the embodiments of this disclosure more clearly, the following briefly describes the accompanying drawings required for describing the embodiments. Apparently, the accompanying drawings in the following description show merely some embodiments of this disclosure, and a person of ordinary skill in the art may still derive other drawings from these accompanying drawings without creative efforts.

Figure 1:
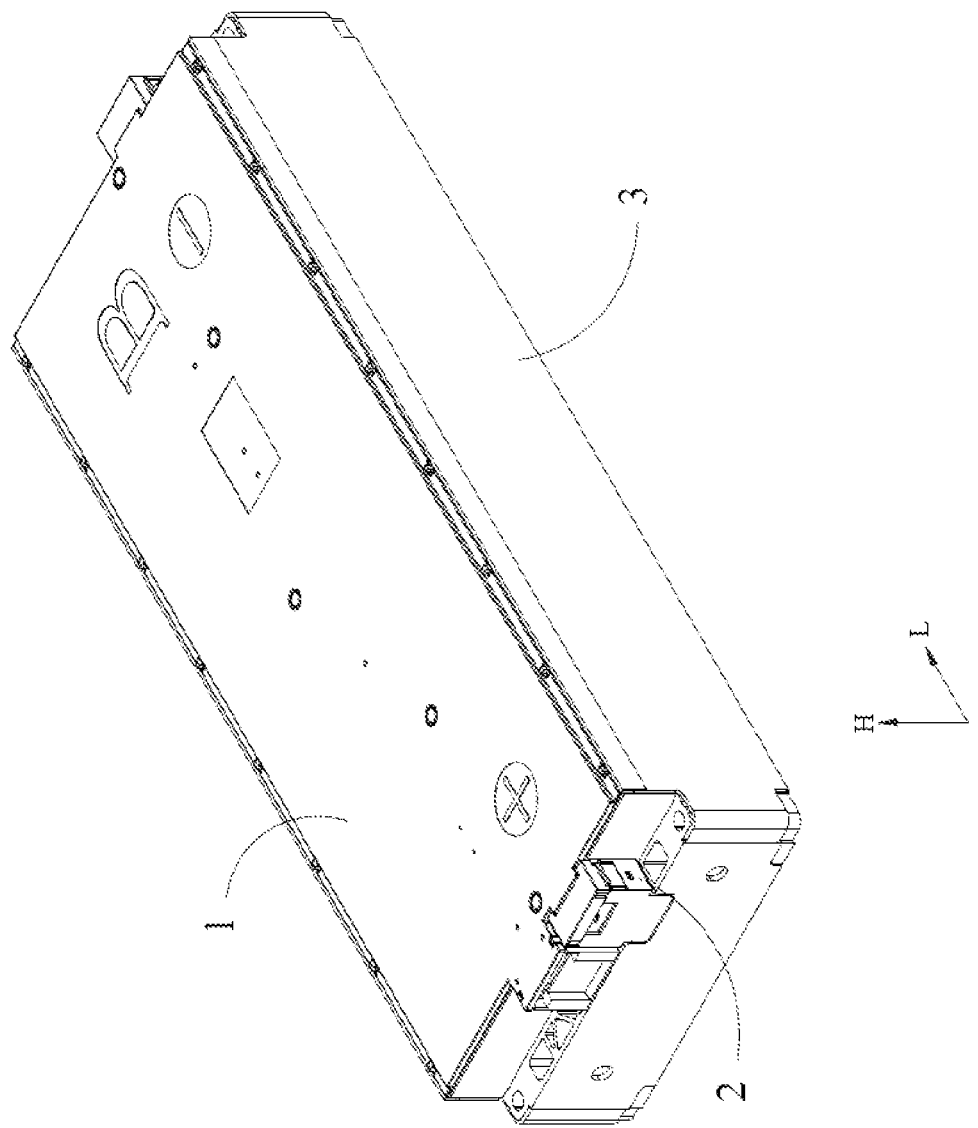
FIG. 1 is a schematic structural diagram of a battery module according to an embodiment of this application.

REFERENCE NUMERALS 1. module upper cover;
    11. extension;
        111. first extension;
            111a. groove;
        112. second extension;
            112a. second protrusion;
        113. connection plate;
            113a. through hole;
    12. body;
2. output assembly;
    21. sampling output base;
        211. first engaging portion;
        212. first protrusion;
        213. second engaging portion;
    22. output electrode base;
    23. protection cover;
        231. notch;
        232. plane;
        233. extended structure;
3. housing;
4. battery cell;
5. sampling circuit board;
    51. reinforcing plate;
    52. sampling substrate;
    53. connector.

DESCRIPTION OF EMBODIMENTS

The following clearly describes the technical solutions in the embodiments of this disclosure with reference to the accompanying drawings in the embodiments of this disclosure. Apparently, the described embodiments are merely some but not all of the embodiments of this disclosure. All other embodiments obtained by a person of ordinary skill in the art based on the embodiments of this application without creative efforts fall within the protection scope of this disclosure.

The terms used in the embodiments of the present application are for the purpose of describing specific embodiments only, and not for limiting the application. The singular forms preceded by "a/an", "the" and "this" used in the embodiments of this application and the appended claims are also intended to include their plural forms, unless otherwise specified expressly in the context.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally represents an "or" relationship between the associated objects.

In the descriptions of the specification, it should be understood that the positional terms such as "up", "down", "left", and "right" described in the embodiments of this application are described as seen from the angles shown in the accompanying drawings, and should not be understood as limitations on the embodiments of this application. In addition, in the context, it should be further understood that when an element is referred to as being "above" or "under" another element, the element can not only be directly connected "above" or "under" the another element, but also be indirectly connected "above" or "under" the another element through an intermediate element.

Figure 2:
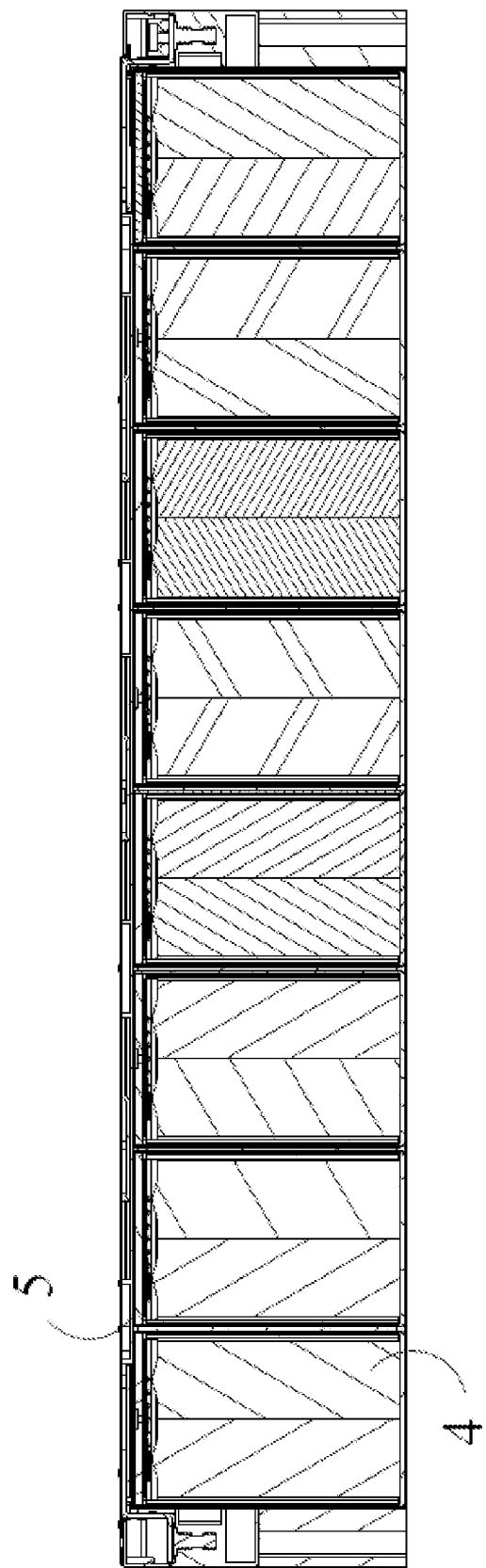
FIG. 2 is a sectional view of a battery module according to an embodiment of this application.
Figure 3:
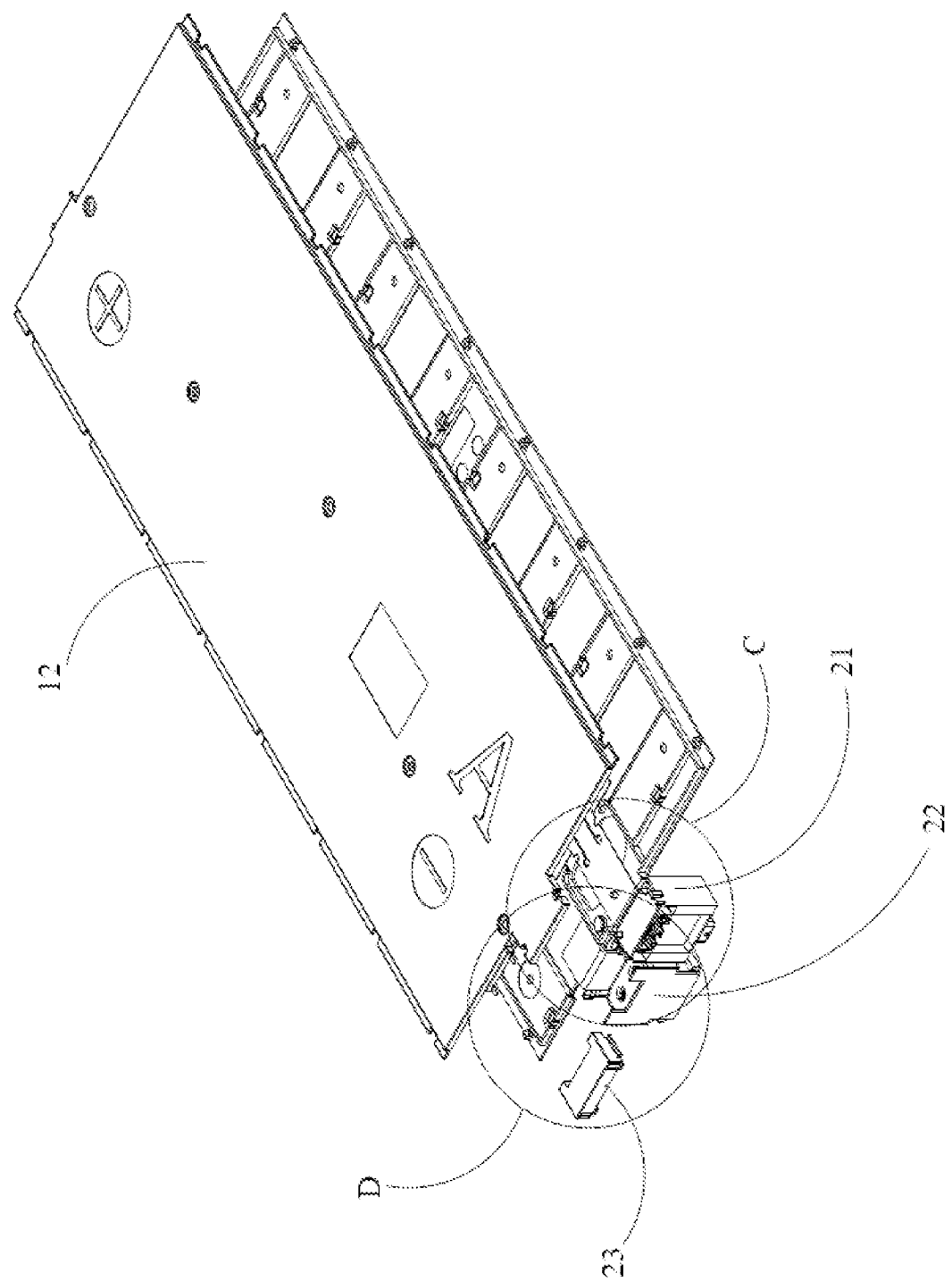
FIG. 3 is a local exploded diagram of a battery module according to an embodiment of this application.

According to FIG. 1 to FIG. 3, an embodiment of this application provides a battery module, including a battery cell 4, a housing 3, an output assembly 2, and a module upper cover 1. Herein, the housing 3 includes an inner cavity for accommodating the battery cell 4, the output assembly 2 is electrically connected to the battery cell 4, and the output assembly 2 is arranged at an exterior side of the housing 3 that faces away from the battery cell 4. The module upper cover 1 seals the inner cavity, and the module upper cover 1 includes a body 12 and an extension 11, where extension 11 is connected to the output assembly 2. The module upper cover is connected to the output assembly 2 via the extension 11, which prevents the module upper cover 1 from getting warped, solving the problem that the module upper cover 1 may easily get warped at the output electrode.

Furthermore, the extension 11 extends from one side or two sides of the body 12 along the length direction (L) of the battery module, and the module upper cover 1 is substantially of a plate structure, enabling the extension 11 of the module upper cover 1 to be on the same level as the body 12 of the module upper cover 1 without extending upward or downward along the height H direction of the battery module. Therefore, the extension 11 does not occupy space in the height direction of the battery module, improving power density of the battery module.

It should be noticed that the extension 11 and the body 12 are molded with integrated injection, and the integrated molded module upper cover 1 features not only a simple molding process but also sufficient strength, ensuring reliability of connection between the module upper cover 1 and the output assembly 2. It should be noted that there is no connection between a conventional module upper cover 1 and an output assembly 2; therefore, during vibration of the battery module, the module upper cover 1 may easily get warped at the output electrode. The module upper cover 1 in the embodiments of this application is connected to the output assembly 2 via the extension 11, which prevents the module upper cover 1 from getting warped, solving the problem that the module upper cover 1 may easily get warped at the output electrode.

Figure 4:
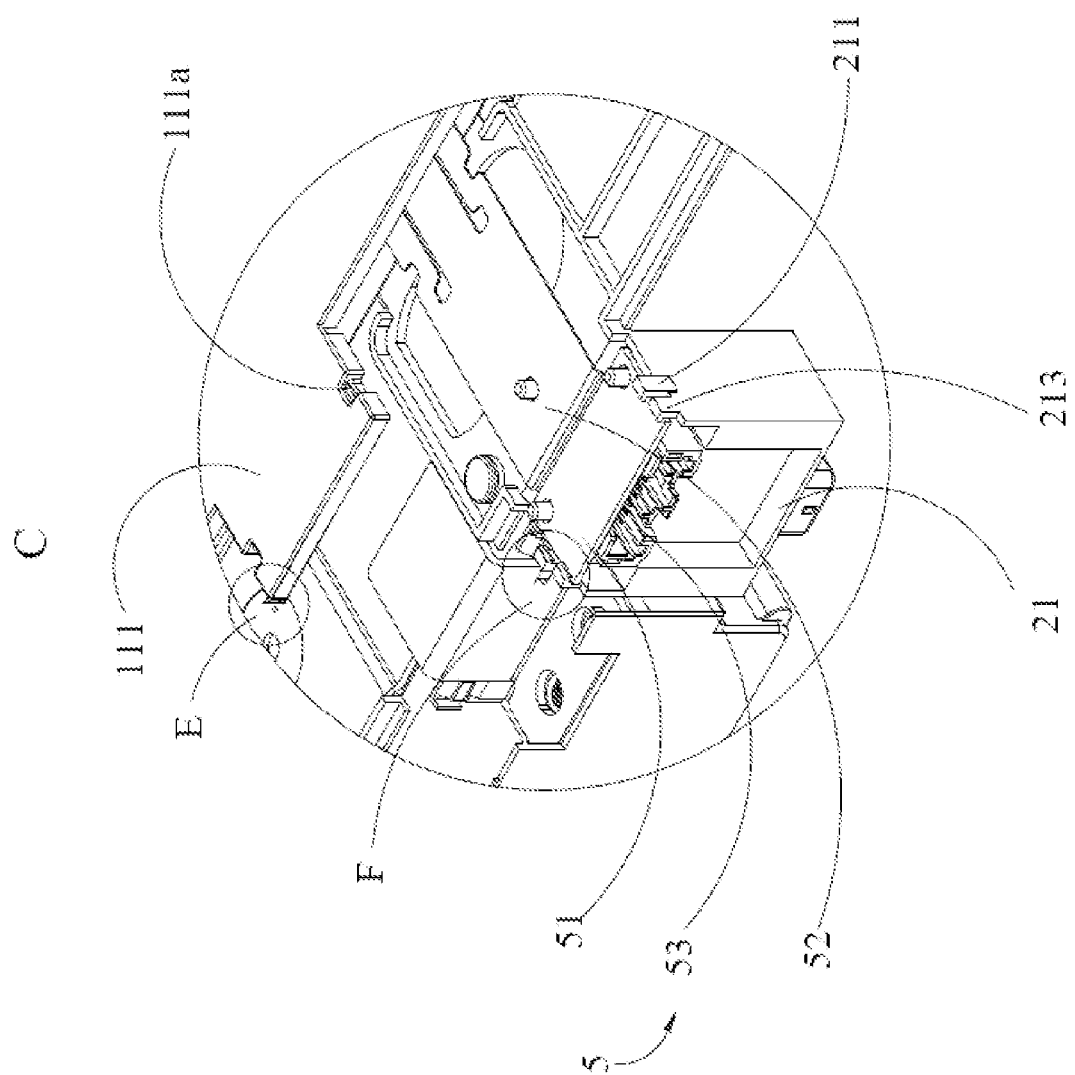
FIG. 4 is a locally enlarged view of a battery module according to an embodiment of this application, based on part C in FIG. 3.

In an embodiment of this application, as shown in FIG. 3 and FIG. 4, the output assembly 2 includes a sampling output base 21 and a sampling circuit board 5. The sampling circuit board 5 includes a sampling substrate 52 and a connector 53, where the sampling substrate 52 is a PCB board or an FPC board (that is, a flexible printed circuit board), and the connector 53 is configured to electrically connect to a sampling substrate 51, and is also applicable to connecting to an external signal output device. A commercially available conventional connector for a PCB or FPC can be selected based on actual applications.

Figure 5:
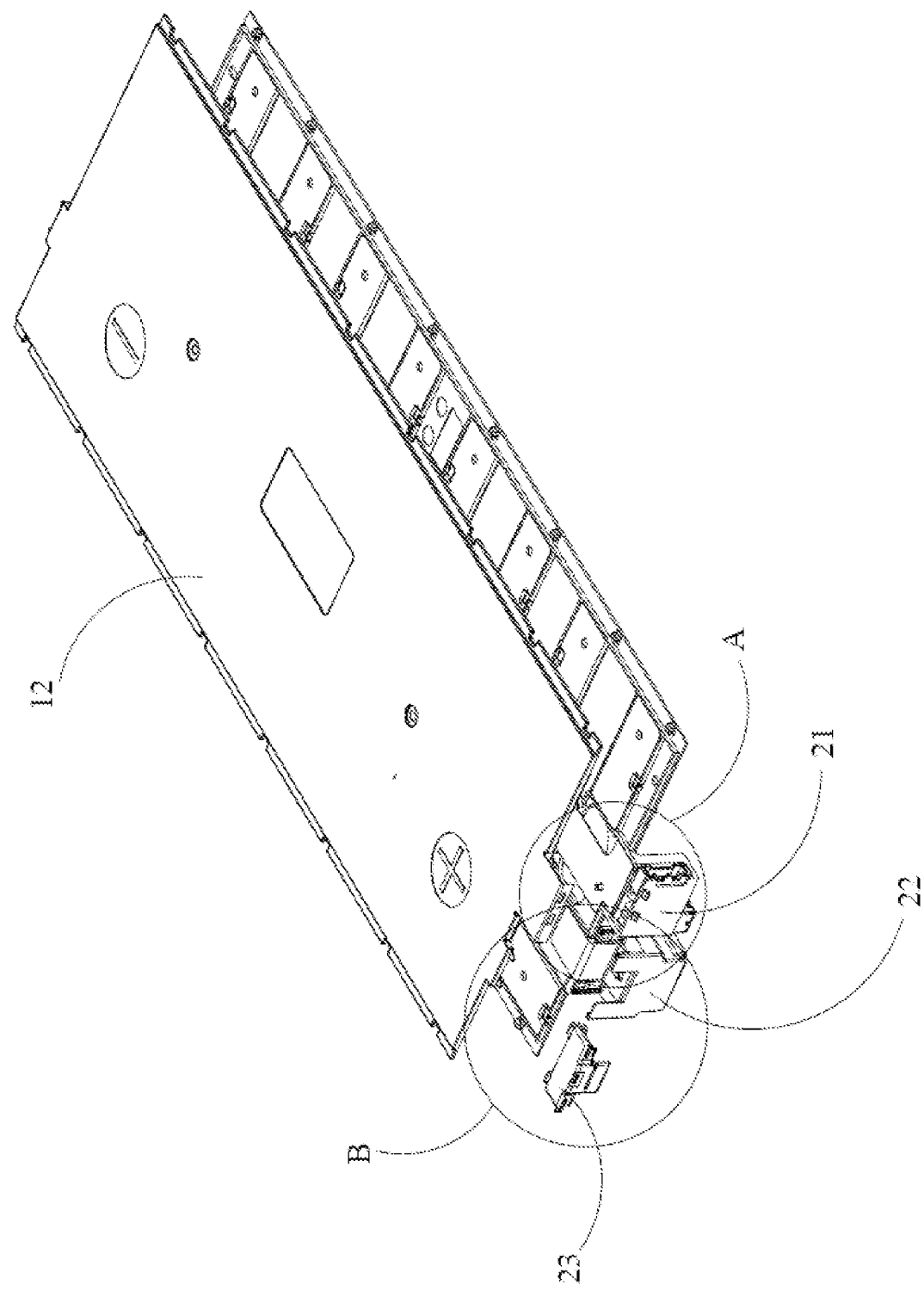
FIG. 5 is a local exploded diagram of a battery module according to an embodiment of this application.
Figure 6:
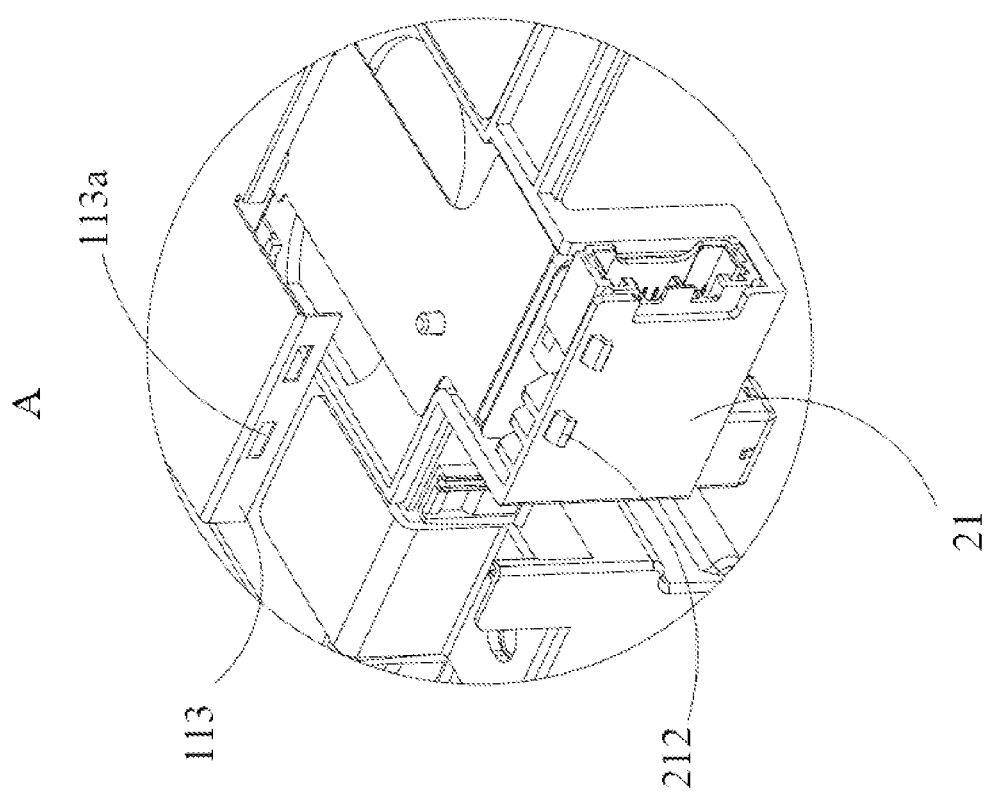
FIG. 6 is a locally enlarged view of a battery module according to an embodiment of this application, based on part A in FIG. 5.

In another embodiment of this application, as shown in FIG. 5 and FIG. 6, the output assembly 2 includes a sampling output base 21 and the extension 11 includes a first extension 111, where the first extension 111 is connected to the sampling output base 21, preventing the module upper cover 1 from getting warped at the output electrode.

It should be noted that the first extension 111 is provided with a groove 111a along the width direction W of the battery module; and the sampling output base 21 is provided with a first engaging portion 211, where the first engaging portion 211 engages the groove 111a to fix first extension 111 to the sampling output base 21, preventing the module upper cover 1 from getting warped at the output electrode.

It should be noted that the first extension 111 extends downward along the height direction (H) of the battery module to provide a connection plate 113, the connection plate 113 provided with a through hole 113a; and the sampling output base 21 is provided with a first protrusion 212 on a side facing toward the housing 3, where the first protrusion 212 fits with the through hole 113a. The first protrusion 212 is inserted into the through hole 113a, further fixing the first extension 111 to the sampling output base 21, which resolves the problem that the module upper cover 1 may easily get warped at the output electrode.

When the sampling substrate 52 is an FPC board, as the FPC is flexible, a reinforcing plate 51 is provided at one end of the sampling substrate 52 connected to the connector 53 to help making a firm electrical connection to the connector 53. Providing the reinforcing plate 51 improves strength of the sampling circuit board 5 at the end and facilitates its connection to the connector 53.

The sampling output base 21 is connected to the reinforcing plate 51 via the second engaging portion 213, and the reinforcing plate 51 is fixed onto the sampling output base 21, so that the connector 52 is fixed in the sampling output base 21. The sampling output base 21 is connected to the first extension 111 of the extension 11. Along the width direction (W) of the battery module, the first extension 111 is provided with the groove 111a, and the sampling output base 21 is provided with the first engaging portion 211; therefore, the first engaging portion 211 engages the groove 111a, so that the first extension 111 is fixed to the output sampling base 21 via the first engaging portion 211, preventing the module upper cover 1 from getting warped at this part.

Figure 7:
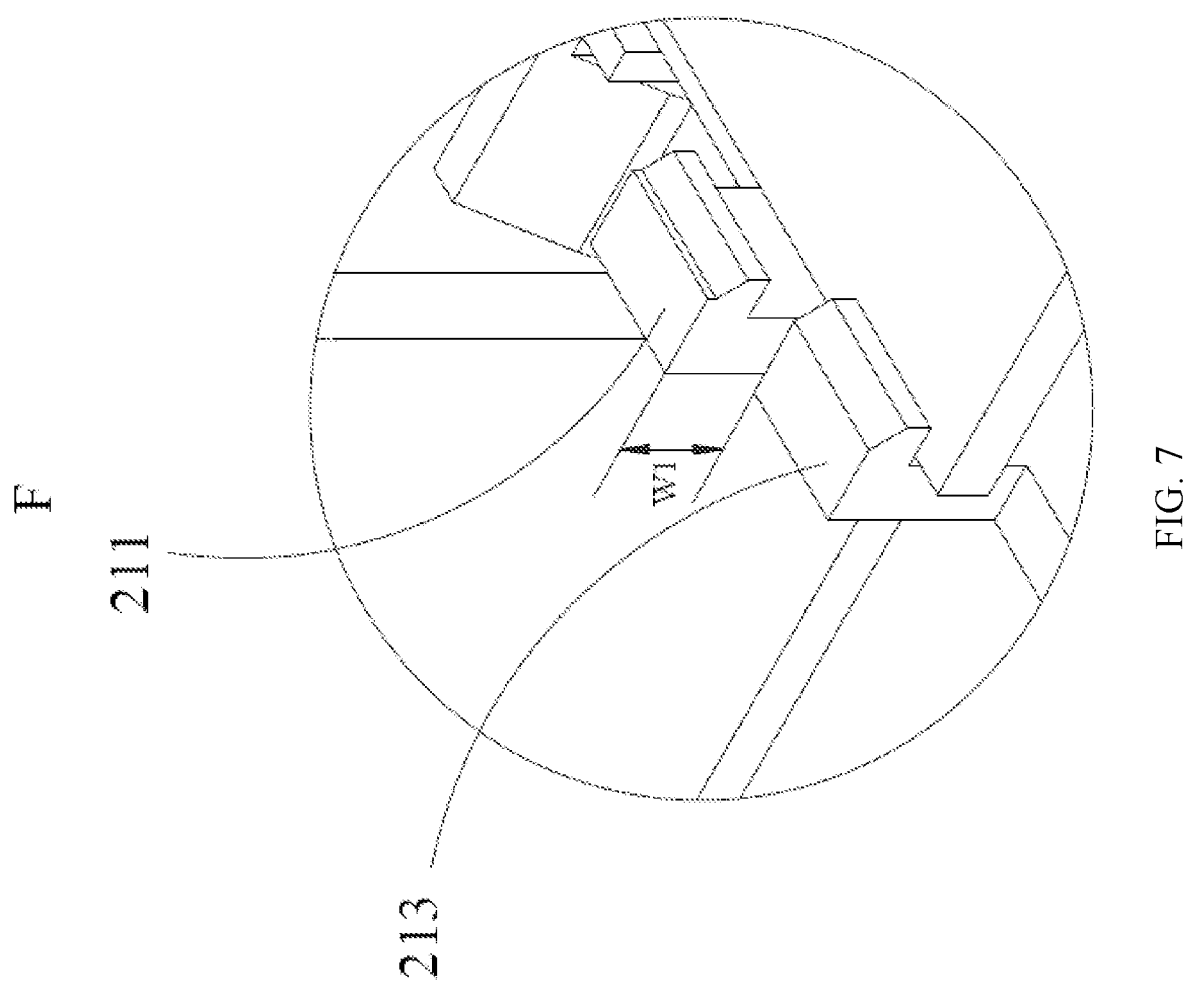
FIG. 7 is a locally enlarged view of a battery module according to an embodiment of this application, based on part F in FIG. 4.
Figure 8:
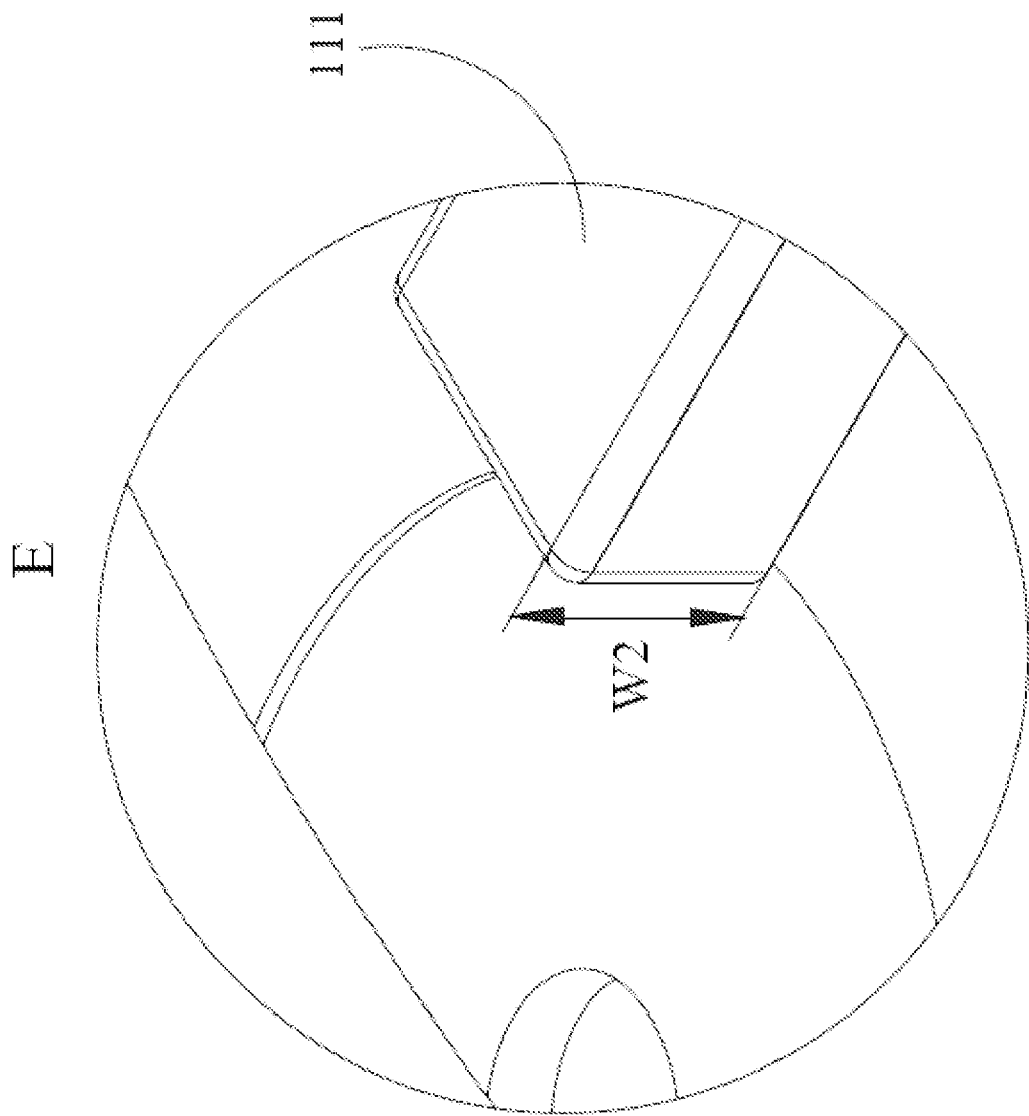
FIG. 8 is a locally enlarged view of a battery module according to an embodiment of this application, based on part E in FIG. 4.
Figure 9:
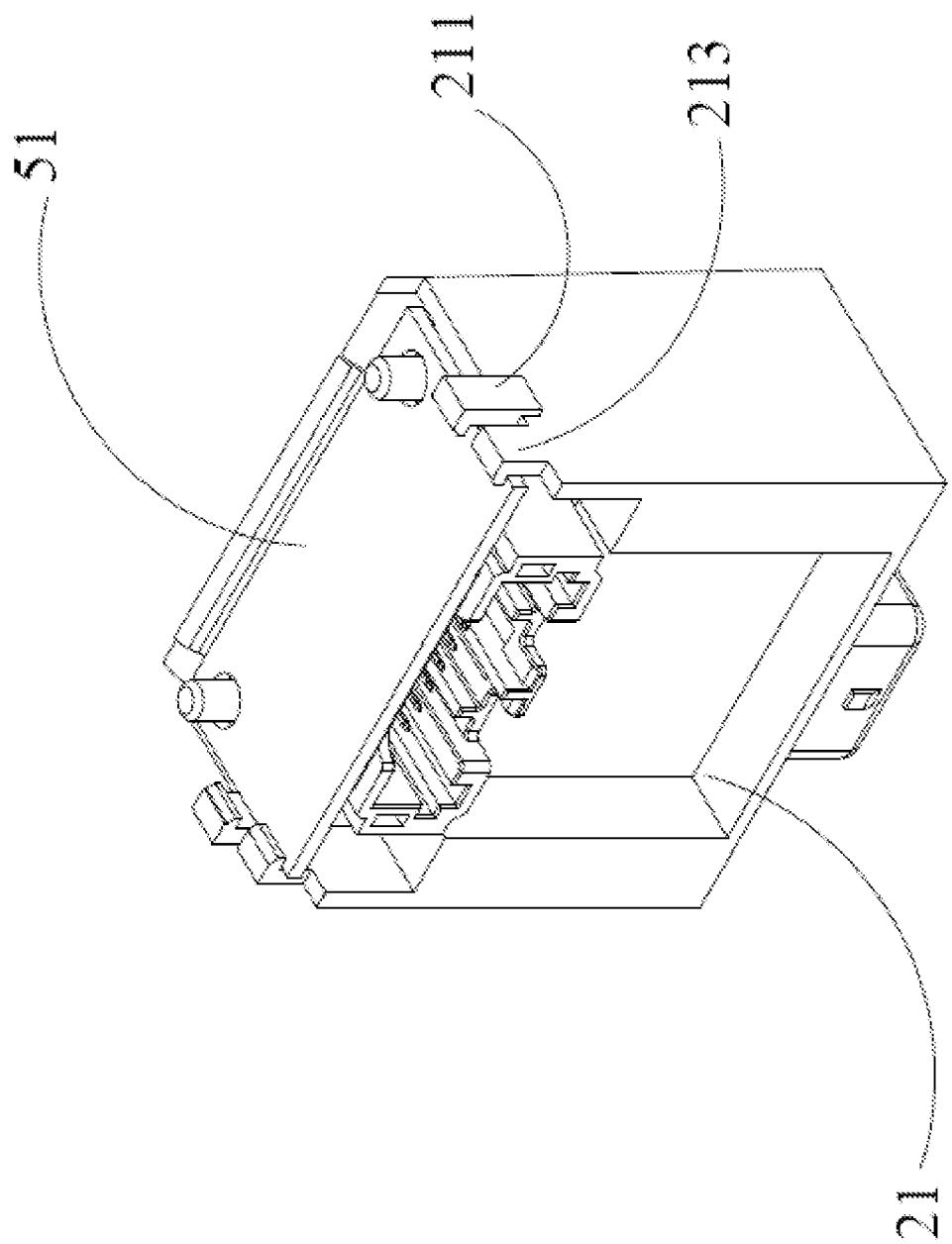
FIG. 9 is a schematic structural diagram of a sampling output base of a battery module according to an embodiment of this application, based on FIG. 3.

Furthermore, as shown in FIG. 7, along the height direction (H) of the battery module, the first engaging portion 211 is higher than the second engaging portion 213, where the second engaging portion 213 is configured to fix the reinforcing plate 51 to the sampling output base 21, and the first engaging portion 211 is configured to fix the first extension 111 to the sampling output base 21. In some embodiments, a height difference (W1) between the first engaging portion 211 and the second engaging portion 213 is smaller than or equal to the thickness (W2) of the module upper cover 1. Therefore, after the battery module is assembled, when the first extension 111 of the module upper cover 1 is in engagement with the first engaging portion 211, the bottom of the first extension 111 is in contact with the top of the second engaging portion 213, and the top of the first extension 111 is higher than the top of the first engaging portion 211, or the top of the first extension 111 is at the same level as the top of the first engaging portion 211, preventing the first engaging portion 211 from occupying space of the battery module, and reducing the volume of a secondary battery.

A distance between two first engaging portions 211 is larger than a distance between two second engaging portions 213, and a difference between the distance between two first engaging portions 211 and the distance between two second engaging portions 213 is 2 millimeters (mm). A distance between an outer surface of the first engaging portion 211 (that is, a side of the first engaging portion 211 facing away from the reinforcing plate 51) and an outer surface of the second engaging portion 213 (that is, a side of the second engaging portion 213 facing away from the reinforcing plate 51) that are on the same side of the reinforcing plate 51 is 1 mm, mainly to facilitate assembling of the reinforcing plate 51 and the module upper cover 1.

It should be noted that an output electrode of the sampling output base 21 is generally a low-voltage output electrode.

It should also be noted that due to providing of the first extension 111, during vibration of the battery module, the low-voltage output electrode is not exposed, providing good safety performance.

Figure 10:
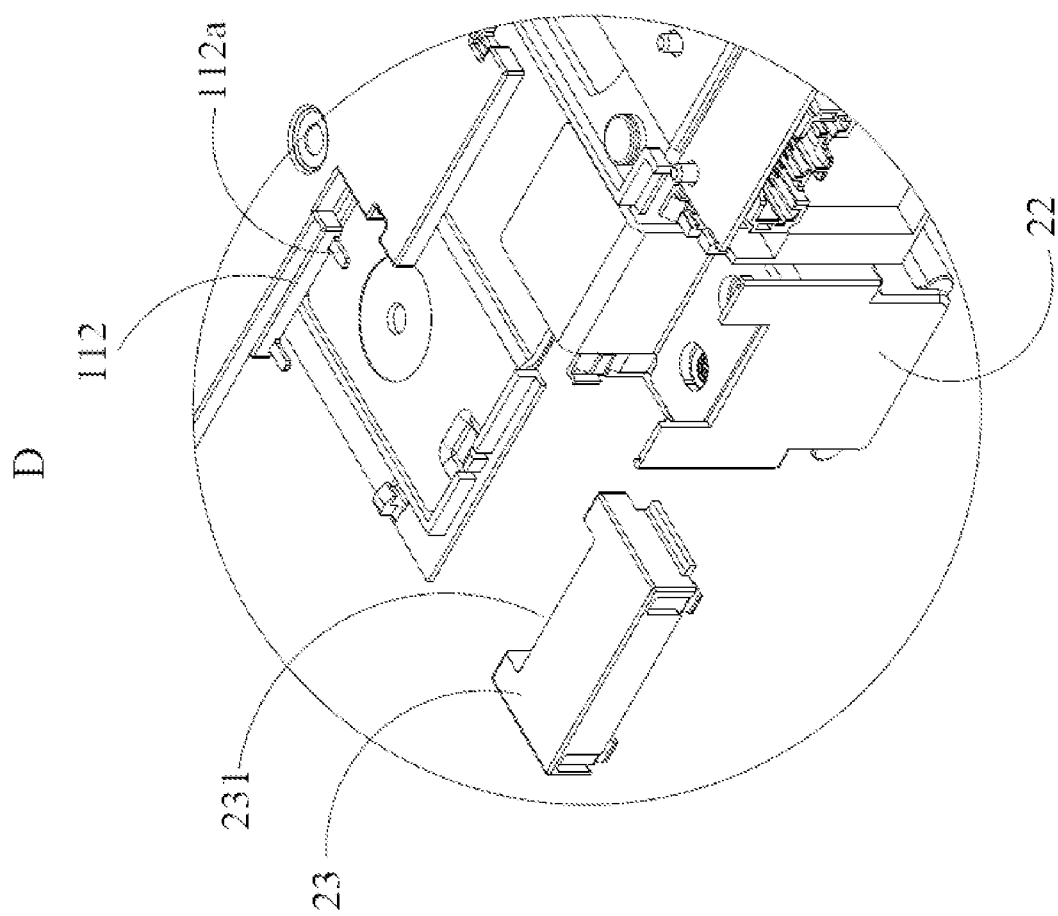
FIG. 10 is a locally enlarged view of a battery module according to an embodiment of this application, based on part D in FIG. 3.
Figure 11:
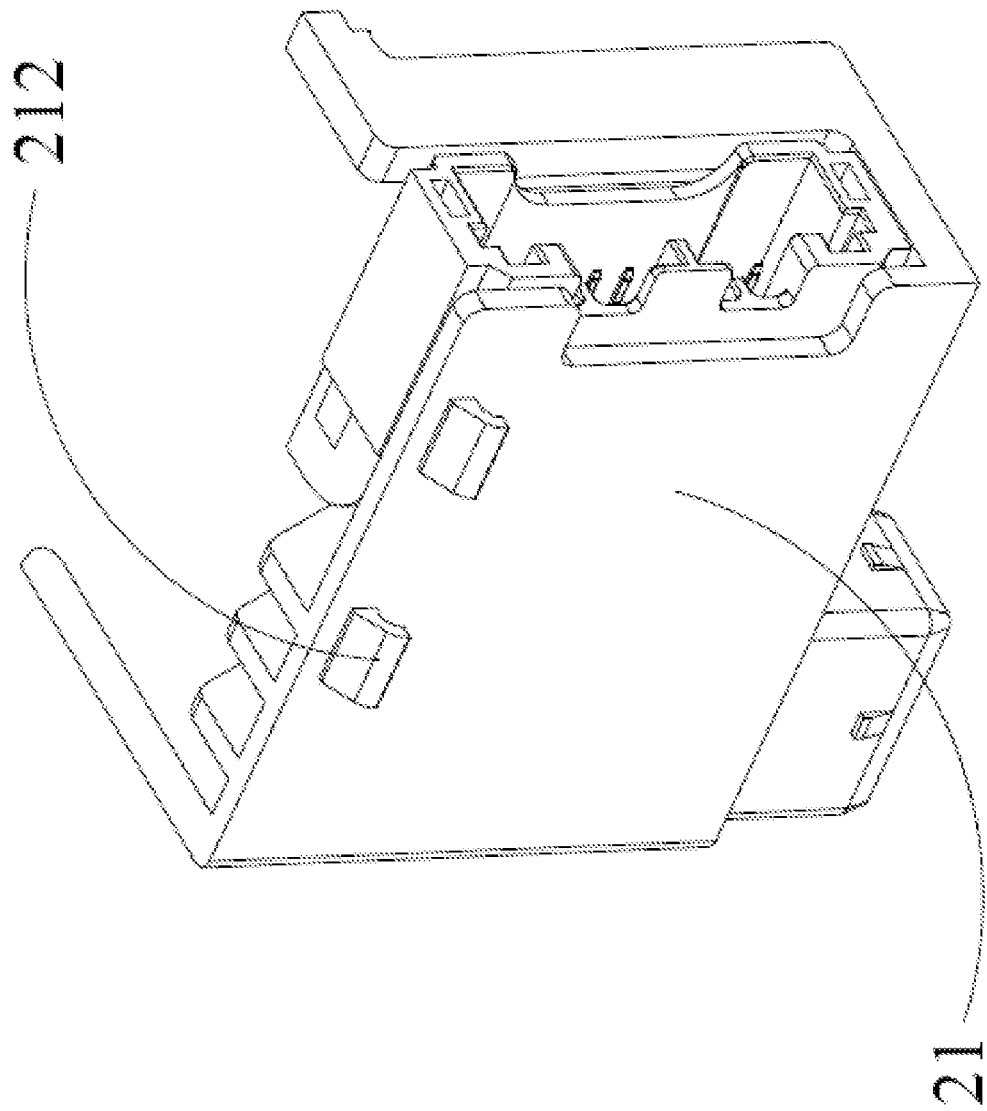
FIG. 11 is a schematic structural diagram of a sampling output base of a battery module according to an embodiment of this application, based on FIG. 5.
Figure 12:
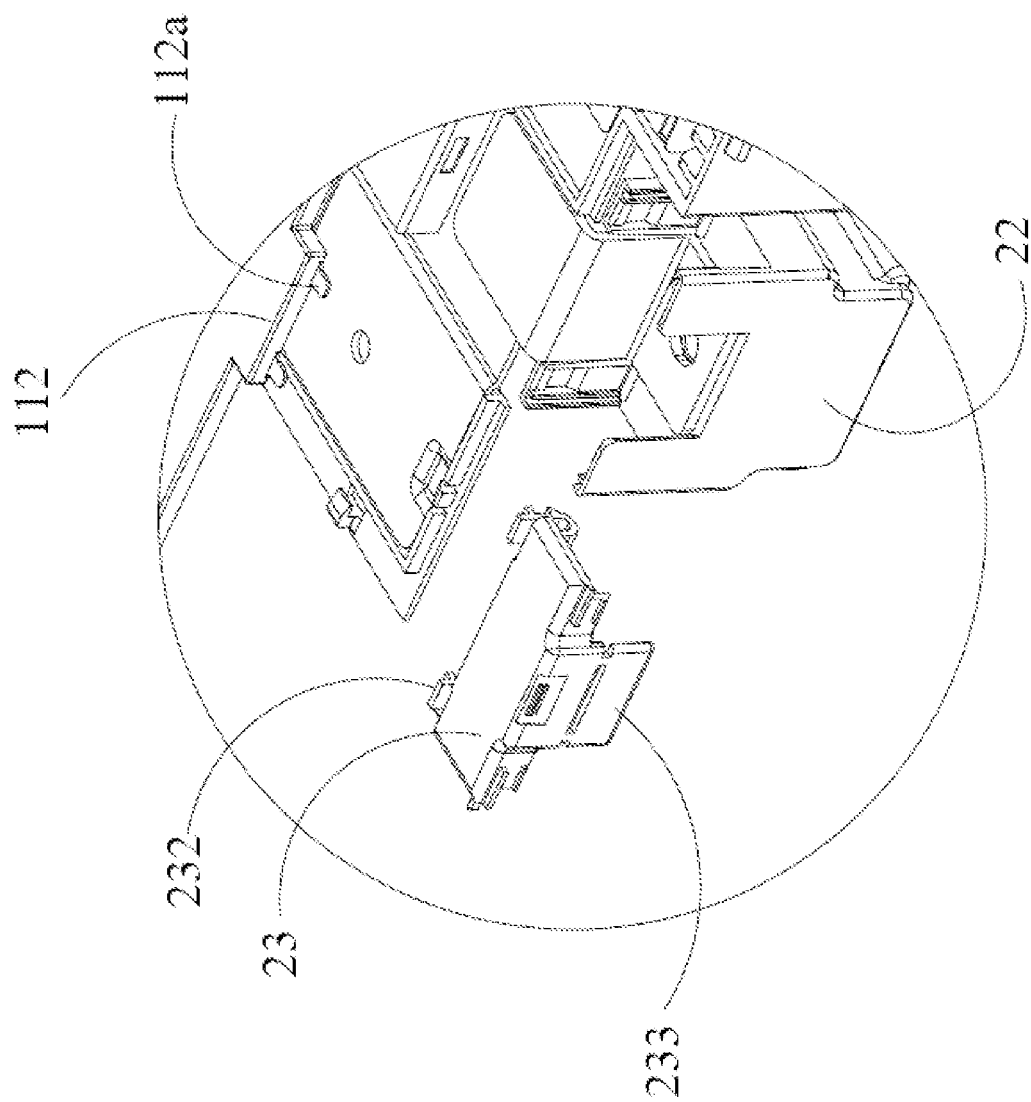
FIG. 12 is a locally enlarged view of a battery module according to an embodiment of this application, based on part B in FIG. 5.

In another embodiment of this application, as shown in FIG. 10 and FIG. 12, the output assembly 2 further includes an output electrode base 22 and a protection cover 23, where the protection cover 23 is connected to the output electrode base 22; and the extension 11 includes a second extension 112, where the second extension 112 is connected to the protection cover 23. During assembling, the second extension 112 is fixed onto the protection cover 23, preventing the second extension 112 from getting warped.

Specifically, the second extension 112 is provided with a second protrusion 112a, where the second protrusion 112a is in interference fit with the protection cover 23 (with an interference typically set to 1 mm); that is, the second protrusion 112a is pressed under an inner side the protection cover 23. As a result, during assembling, the second protrusion 112a is in interference fit with the protection cover 23, further fixing the second extension 112 to the protection cover 23. The output electrode base 22 is fixedly connected to the protection cover 23. When the protection cover 23 is in engagement with the second extension 112, the protection cover 23, the output electrode base 22 and the second extension 112 together form a protection space of the output electrode, providing good safety performance. Moreover, the second extension 112 is fixed onto the protection cover 23, preventing the second extension 112 from getting warped.

It should be noted that a specific structure of the protection cover 23 is not limited, as long as the protection cover 23 is in interference fit with the second protrusion 112a. As shown in FIG. 10, a side of the protection cover 23 nearer to the extension 11 is provided with a notch 231, where the notch 231 is in interference fit with the second extension 112. Alternatively, as shown in FIG. 12, a side of the protection cover 23 farther away from the extension 11 is provided with an extension structure 233, where the extension structure 233 extends downward along the height H direction of the battery module; and a side of the protection cover 23 nearer to the extension 11 is provided with a plane 232, where after the battery module is assembled, the plane 232 is in interference fit with the second extension 112.

It should be noted that due to providing of the second protrusion 112a, it is only necessary to make the second protrusion 112a in interference fit with the protection cover 23 during assembly without the need to use tools such a sleeve, which prevents the sleeve from interfering with the output electrode or the module upper cover.

It should be noted that the output electrode corresponding to the output electrode base 22 is a high-voltage positive output electrode or a high-voltage negative output electrode. Because the protection cover 23 has a same structure for either a high-voltage positive output electrode or a high-voltage negative output electrode, the output electrode base 22 is the same for either the high-voltage positive output electrode or the high voltage negative output electrode.

It should also be noted that due to providing of the second extension 112, during vibration of the battery module, the high-voltage positive output electrode or high-voltage negative output electrode are not exposed, which avoids the risk of a short circuit and features good safety performance.

Figure 13:
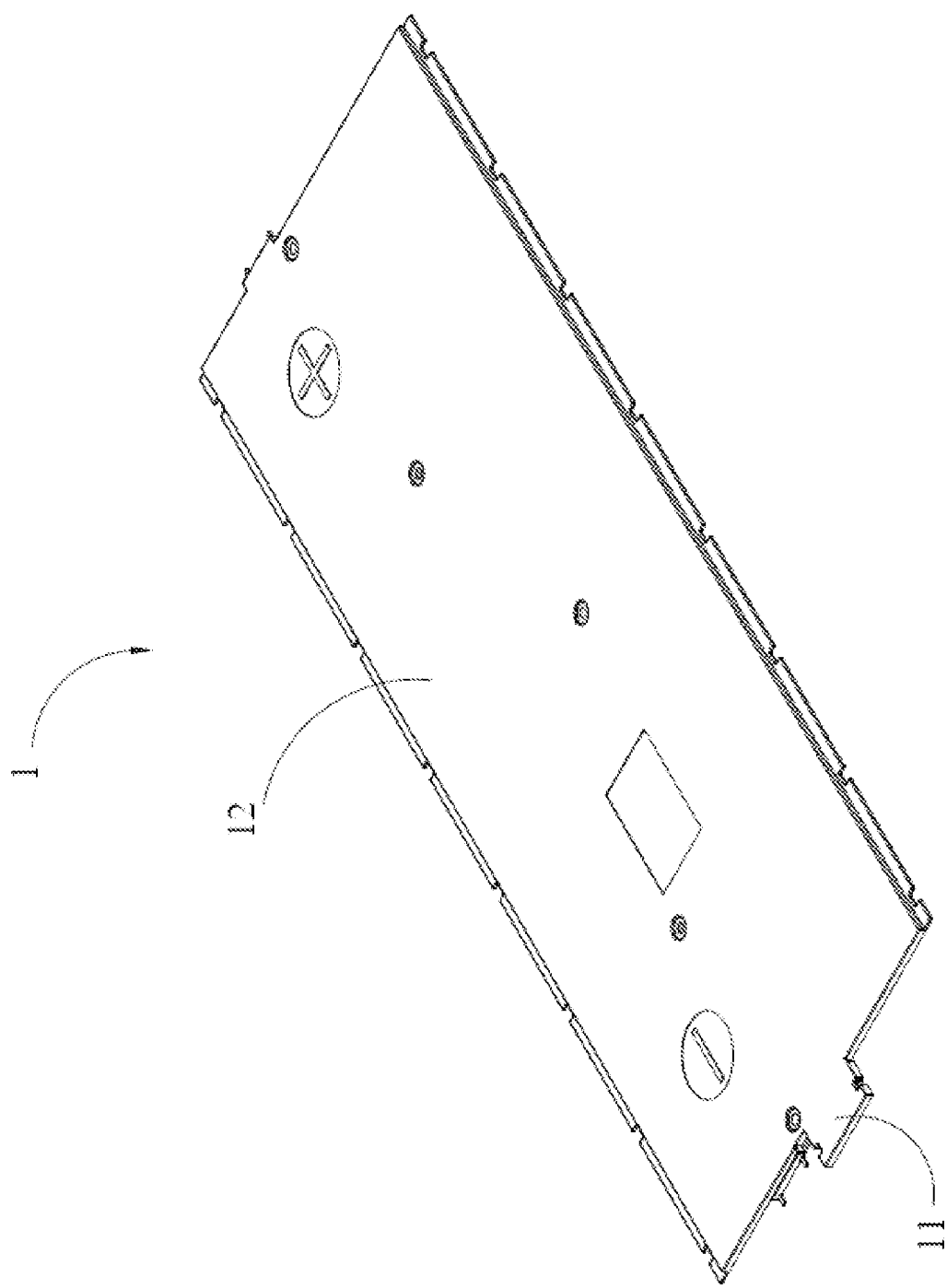
FIG. 13 is a schematic diagram of a module upper cover of a battery module according to an embodiment of this application.
Figure 14:
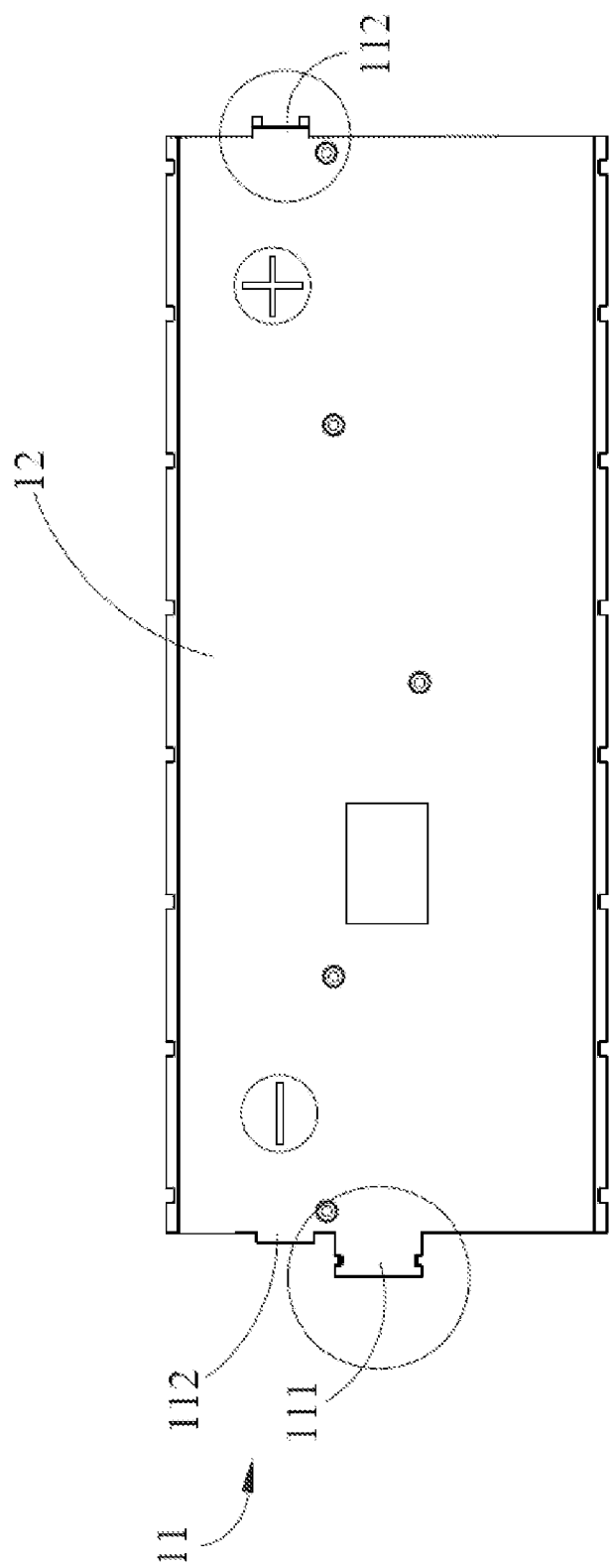
FIG. 14 is a top view of a module upper cover of a battery module according to an embodiment of this application.
Figure 15:
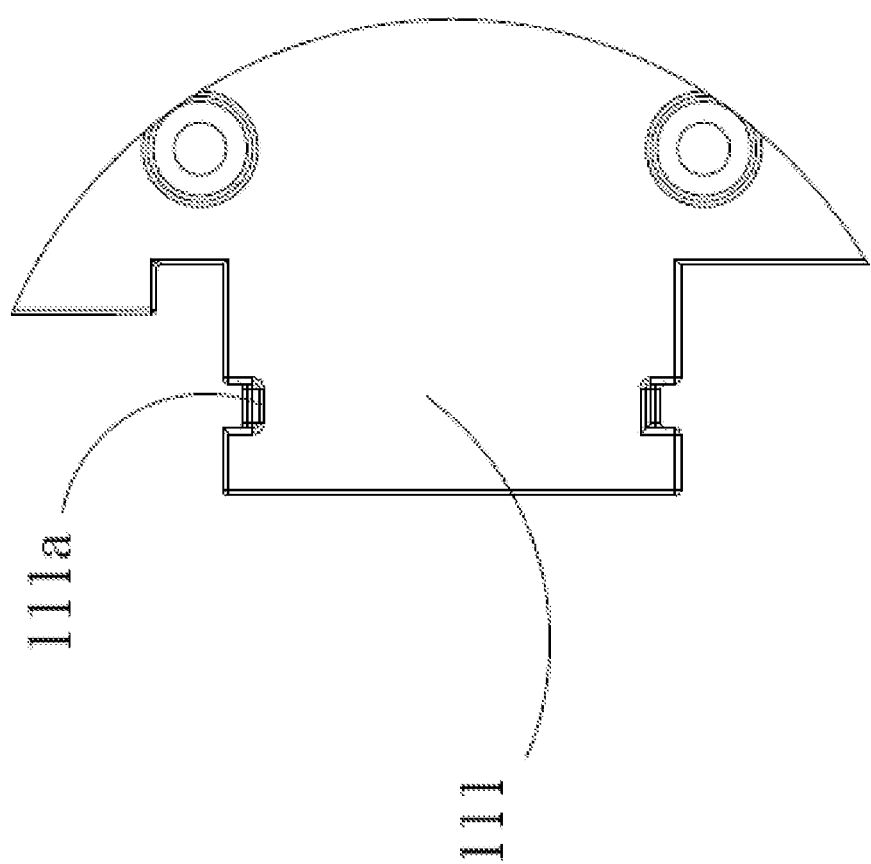
FIG. 15 is a locally enlarged view of a battery module according to an embodiment of this application, based on FIG. 14.
Figure 16:
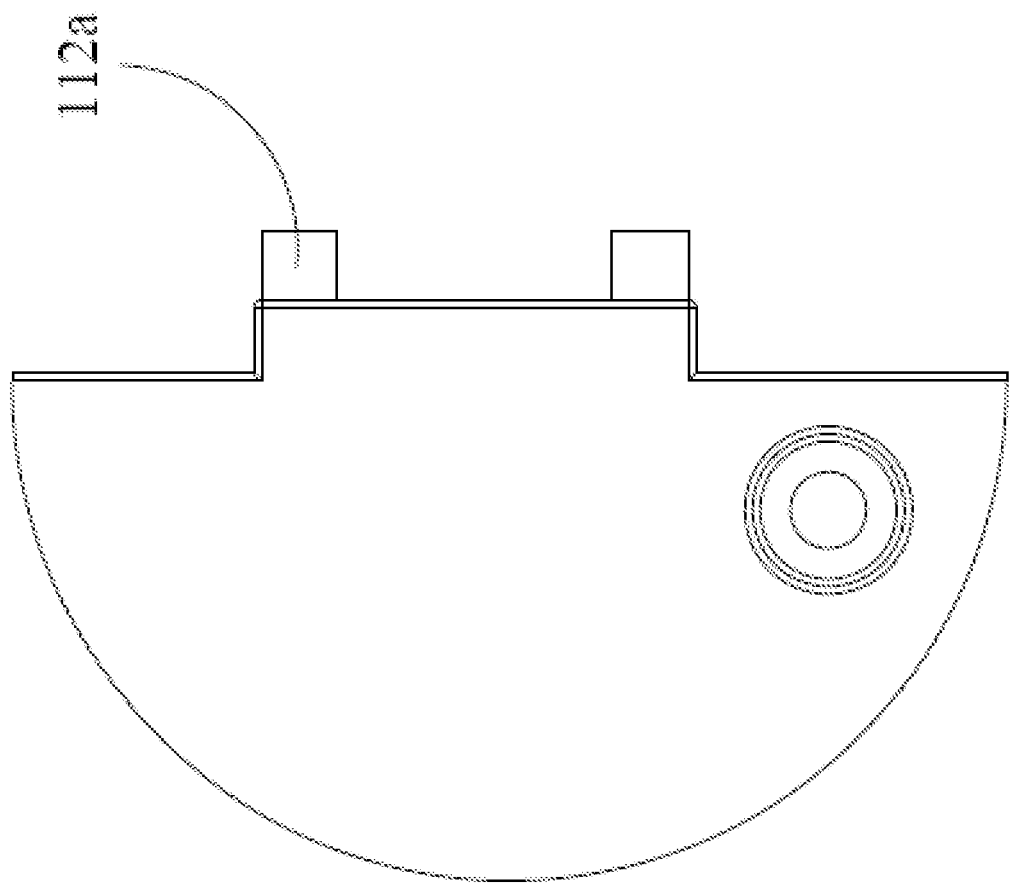
FIG. 16 is a locally enlarged view of a battery module according to an embodiment of this application, based on FIG. 14.

In another embodiment of this application, as shown in FIG. 3, FIG. 12, and FIG. 13, the output assembly 2 includes a sampling output base 21 and two output electrode bases 22, where along the length direction (L) of the battery module, the sampling output base 21 is located on either side of the housing 3, and the two output electrode bases 22 are respectively located on two sides of the housing 3. The extension 11 includes a first extension 111 and two second extensions 112, where, along the length direction (L) of the battery module, the first extension 111 is located on either side of the body 12 and the housing 3, and the two second extensions 112 are respectively located on two sides of the body 12. In this case, the first extension 111 is connected to the sampling output base 21, and the second extensions 112 are connected to the output electrode bases 22. The module upper cover 1 is connected to three output assemblies 2 respectively via the first extension 111 and two second extensions 112, which prevents the module upper cover 1 from getting warped, solving the problem that the module upper cover 1 may easily get warped at the output electrode.

It should be noted that an output electrode corresponding to the sampling output base 21 is generally a low-voltage output electrode. Output electrodes corresponding to the two output electrode bases 22 are a high-voltage positive output electrode and a high-voltage negative output electrode respectively.

In conclusion, when the extension 11 extends from one side of the body 12 along the length direction (L) of the battery module, the first extension 111 may be connected to the sampling output base 21 to prevent the module upper cover 1 from getting warped. Alternatively, the second extension 112 may be connected to the output electrode base 22 to prevent the module upper cover 1 from getting warped. When the extension 11 extends from two sides of the body 12 along the length direction (L) of the battery module, one sampling output base 21 is provided and one or two output electrode bases 22 are provided; the sampling output assembly 2 is connected to the first extension 111 and the output electrode bases 22 are connected to the second extensions 112 to prevent the module upper cover 1 from getting warped. Therefore, the embodiments of this application resolve the warping problem caused by the module upper cover 1 not having a fixed structure at a high-voltage positive output electrode, a high-voltage negative output electrode or a low-voltage output electrode due to space limitation.

In some embodiments, an electric apparatus includes the aforementioned battery module.

The above described are only optional embodiments of this application that are not intended to limit this application. For those skilled in the art, this application may have various changes and variations. Any modification, equivalent replacement, or improvement made without departing from the spirit and principle of this application shall fall within the protection scope of this application.

What is claimed is:

1. A battery module, comprising:
  a plurality of battery cells;
  a housing, wherein the housing comprises an inner cavity for accommodating the battery cells;
  an output assembly, wherein the output assembly is electrically connected to the battery cells, and the output assembly is arranged at an outer side of the housing that faces away from the battery cells;
  a module upper cover of a plate structure overall, wherein the module upper cover seals the inner cavity, and the module upper cover comprises a body and an extension, wherein the extension is connected to the output assembly; and
  a sampling circuit board;
  wherein the extension extends from one side or two sides of the body along a length direction of the battery module;
  wherein the output assembly comprises a sampling output base, and the extension comprises a first extension, wherein the first extension is connected to the sampling output base, and wherein the first extension is provided with a groove along a width direction (W) of the battery module, and the sampling output base is provided with a first engaging portion, wherein the first engaging portion cooperates with the groove, the first extension is a flat plate coplanar with the body of the module upper cover, and the first engaging portion comprises a first plate portion parallel to a horizontal plane and a second plate portion perpendicular to the horizontal plane;
  wherein a first end the first extension is connected to the body, and a second end of the first extension is connected to a connection plate extending in a height direction of the battery module, the second end being opposite to the first end, the height direction being perpendicular to the width direction and the length direction;
  wherein the connection plate comprises a through hole penetrating the connection plate along the length direction, and the sampling output base comprises a protrusion configured to be inserted into the through hole, to fix the first extension to the sampling output base;
  wherein one end of the sampling circuit board is connected to a reinforcing plate, the sampling output base is connected to the reinforcing plate via a second engaging portion, and the second engaging portion comprises a third plate portion parallel to the horizontal plane and a fourth plate portion perpendicular to the horizontal plane; and wherein along a height direction (H) of the battery module, a top of the first plate portion of the first engaging portion is higher than a top of the third plate portion of the second engaging portion, a bottom of the first extension is in contact with the top of the third plate portion of the second engaging portion, and a top of the first extension is coplanar with the top of the first plate portion of the first engaging portion.

2. The battery module according to claim 1, wherein a height difference between the first engaging portion and the second engaging portion is smaller than or equal to a thickness (W2) of the module upper cover.

3. The battery module according to claim 1, wherein the output assembly further comprises a protection cover, the protection cover connected to an output electrode base; and
the extension comprises a second extension, the second extension connected to the protection cover.

4. The battery module according to claim 3, wherein
the second extension is provided with a second protrusion; and
the second protrusion is in interference fit with the protection cover.

5. The battery module according to claim 1, wherein the output assembly comprises, further to the sampling output base, two output electrode bases;

along a length direction (L) of the battery module, the two output electrode bases are respectively located on two sides of the housing;
along the length direction (L) of the battery module, the sampling output base is located on either side of the housing;
the extension comprises, in addition to the first extension, two second extensions;
along the length direction (L) of the battery module, the two second extensions are respectively located on two sides of the body;
along the length direction (L) of the battery module, the first extension is located on either side of the body; and
the second extensions are connected to the output electrode bases.

6. The battery module according to claim 1, wherein a size of the first extension in the width direction of the battery module is smaller than a size of the body in the width direction of the battery module.

7. The battery module according to claim 1, wherein the first extension is connected to the body at a first side of the first extension, and the groove is at a second side of the first extension, the first side being perpendicular to the second side in a horizontal plane.

* * * * *